United States Patent [19]

Moshal

[11] 4,177,774
[45] Dec. 11, 1979

[54] CONTROL VALVES

[75] Inventor: John H. Moshal, Westville, South Africa

[73] Assignee: Control Logic (Proprietary) Limited, Durban, South Africa

[21] Appl. No.: 698,408

[22] Filed: Jun. 21, 1976

[30] Foreign Application Priority Data

Jun. 25, 1975 [ZA] South Africa .................. 75/4076

[51] Int. Cl.$^2$ .................. F02D 11/10; F02D 28/00; F02D 31/00
[52] U.S. Cl. .................. 123/102; 137/870
[58] Field of Search .................. 123/102; 137/870

[56] References Cited

U.S. PATENT DOCUMENTS

| 3,026,908 | 3/1962 | Blair | 137/627.5 |
|---|---|---|---|
| 3,077,207 | 2/1963 | Koutnik | 137/622 |
| 3,207,252 | 9/1965 | Cripe et al. | 180/82.1 |
| 3,372,680 | 3/1968 | Scholl | 123/102 |
| 3,811,418 | 5/1974 | Sakakibara | 123/102 |

FOREIGN PATENT DOCUMENTS 1475949 4/1969 Fed. Rep. of Germany .

Primary Examiner—Charles T. Jordan
Assistant Examiner—Thomas H. Webb
Attorney, Agent, or Firm—Stevens, Davis, Miller & Mosher

[57] ABSTRACT

This invention relates to a valve for use in the automatic control of a vehicle and which may conveniently be powered from a vehicle speed monitoring electronic system. It is essentially a solenoid operated valve for vehicle control comprising a hollow body of non-magnetic material having an inlet and an outlet axially aligned with each other, valve seats at the inlet and outlet, a piston of magnetic material slidable in said body between positions closing the opening through either one or other valve seat, and a bore through the piston and in communication with a normally open outlet from the body. A considerable constriction is provided between the piston controlled inlet and the outlet from the body. The normally open outlet is suitable for connection to a vacuum operated servo-mechanism, the piston controlled outlet is suitable for connection to the vehicle engine vacuum line and the inlet is open to ambient atmosphere.

4 Claims, 4 Drawing Figures

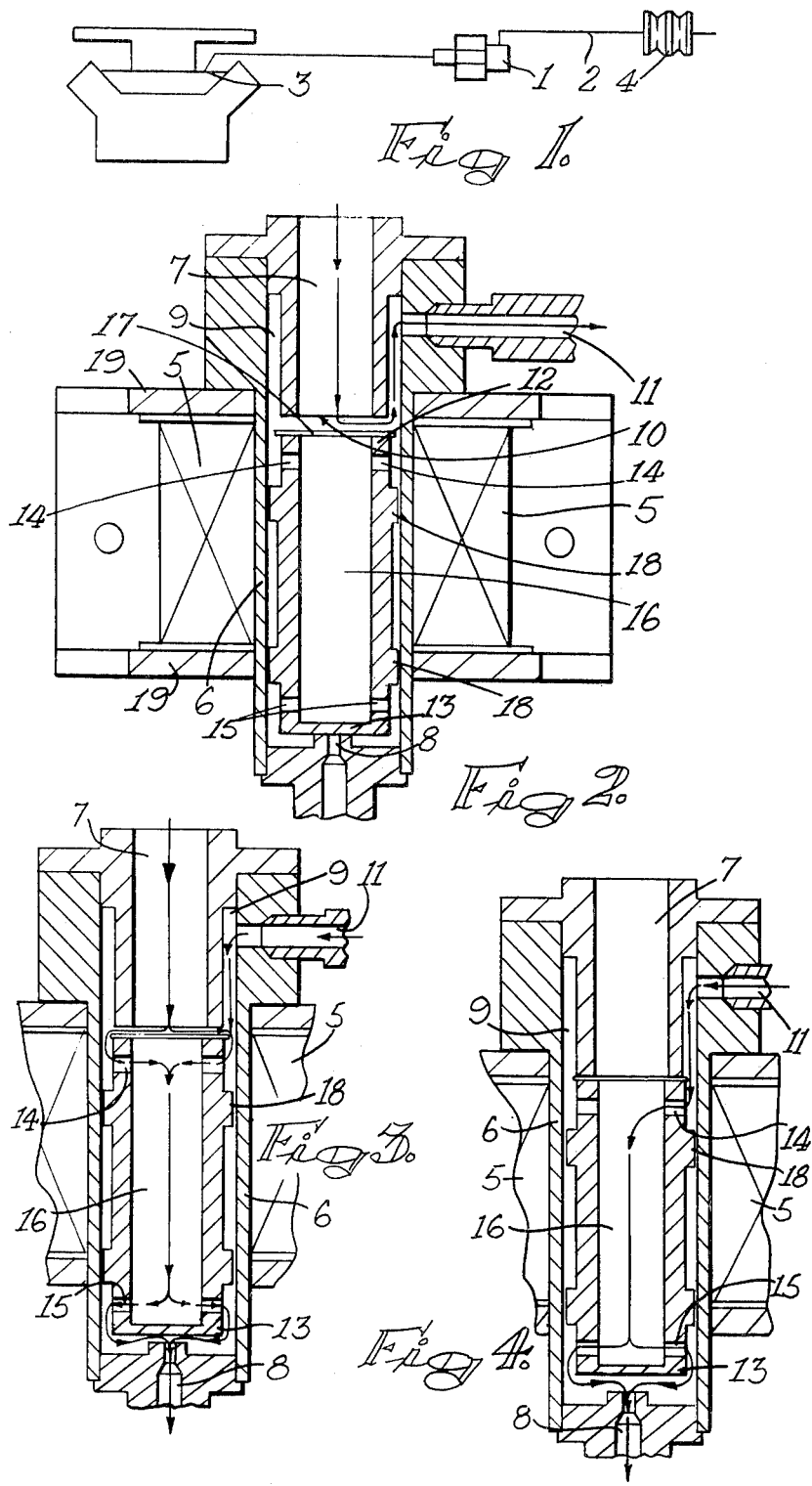

CONTROL VALVES

BACKGROUND TO THE INVENTION

This invention relates to control valves and more particularly to such valves which may be used, for example, to control the operation of a vehicle engine to provide speed control over the vehicle.

In order to provide automatic speed control of a vehicle it is necessary to use a speed monitoring system. The information from this system can be used to vary the fuel supply to the engine in accordance with the demands made on the engine during use and thus control its speed.

The speed monitoring can most conveniently be obtained through the use of electronic circuitry and electrical signals generated in direct proportion to vehicle speed which can be obtained in a number of ways. For example, a magnetic field can be provided to rotate with a vehicle component such as a propeller shaft which moves at a speed directly proportional to the road speed of the vehicle under normal operating conditions. Variations in this magnetic field due to rotation of the propeller shaft will induce electrical signals in a suitable detector such as a coil and these signals can be amplified and used to control the operation of a valve in the vehicle fuel supply as is described more fully below.

For the automatic control of the vehicle to operate effectively it is necessary that both the speed monitoring and valve control be efficient over the whole speed range that can be controlled.

The fuel demand by the engine can be gauged by the degree of vacuum attained in the vehicle inlet manifold and this vacuum utilized to control a servo-mechanism operating on the vehicle throttle.

Automatic control systems known to the Applicant prior to this invention and having solenoid operated valves in the vehicle vacuum line which are of an on-off or proportional type, are affected by variations in engine manifold pressure. Thus an electronic feedback signal is required because there must be a change of vehicle speed before automatic compensation takes place. This leads to slight but annoying speed instability.

SUMMARY OF THE INVENTION

It is the object of this invention to provide means whereby vehicle speed related signals as above described can be used to control the supply of fuel to the engine to maintain the vehicle running at a constant speed.

According to this invention there is provided a solenoid operated valve for vehicle control comprising a hollow body of non-magnetic material having an inlet and an outlet axially aligned with each other, valve seats at the inlet and outlet, a hollow piston of magnetic material having a head at each end and slidable in said body between positions closing the inlet or outlet from communicating with the interior of the body, ports through the piston wall in communication with a normally open second outlet from the body, the outlet from the body being controllably coupled with the inlet or first outlet, there being a considerable constriction between the piston controlled inlet and outlet from the body and with the normally open outlet being adapted for connection to a vacuum operated servo-mechanism, the piston controlled outlet for connection to the vehicle engine vacuum line and the inlet being open to ambient atmosphere.

The invention also provides for the normally open outlet opening to be between five and ten times the cross-sectional area of the piston controlled outlet opening and appreciably smaller than the inlet opening.

Further features of this invention provide for the solenoid coil to be located around the hollow body and for a yoke of magnetic material to longitudinally surround the coil such that the piston movement within the coil will be constrained to pass through one end of the yoke but not the other.

Still further features of this invention provide a speed control system for a motor vehicle comprising a speed monitoring and electrical signal generating electronic circuit connected to control a valve as defined above in a vacuum line connected from the vehicle engine inlet manifold to a vacuum operated servo-mechanism connected to the vehicle throttle.

BRIEF DESCRIPTION OF THE DRAWINGS

A preferred embodiment of this invention is described below with reference to the accompanying drawings in which:

FIG. 1 is a diagrammatic view of the control system,

FIG. 2 is a sectional view of the valve arrangement when the engine is not under automatic control, and FIGS. 3 and 4 show the valve under different automatic control conditions.

DETAILED DESCRIPTION OF A PREFERRED EMBODIMENT OF THE INVENTION

As illustrated the system consists of a solenoid controlled valve 1 in a vacuum line 2 between the engine inlet manifold 3 and a vacuum operated servo-mechanism 4 which is adapted to regulate the engine throttle in the fuel supply for the engine. The power for the solenoid of the valve assembly is obtained from electronic circuitry which generates electrical signals dependent on the speed of the vehicle.

The valve 1 is arranged so that it closes the vacuum line 3 and admits atmospheric pressure through line 2 to the servo-mechanism 4, which is then inoperative and the vehicle throttle is, under such circumstances, closed. As the valve 1 is opened to a greater or lesser extent the engine vacuum is applied to the servo-mechanism to open the throttle for the vehicle engine to an equivalent extent.

Essentially the electrical signals will be generated in a detector coil located in the vehicle to be under the influence of a magnetic field associated with a vehicle component which rotates at a speed proportional to the road speed of the vehicle. This magnetic field can be easily obtained by fixing a pair of strip magnets longitudinally of and in diametrically opposed positions on the vehicle propeller shaft. It will be readily apparent that a magnetic field which rotates proportionally to vehicle road speed can be obtained from the magnetised vehicle components.

The circuitry will ensure that the voltage of signals generated by the speed monitoring coil will be amplified and will be of increasing value proportionally to the lessening of vehicle speed below a predetermined speed while it will drop off if the speed increases over the predetermined speed.

These amplified signals are used to supply the power to the solenoid coil 5 of the solenoid valve 1.

This valve 1 is an essential part of the system and is carefully designed to enable the system to work satisfactorily.

The valve 1 consists of tubular body 6 of non-magnetic material providing an axial inlet opening 7 and an outlet opening 8 which are, in use, open to atmosphere and connected to the vacuum line to the engine inlet manifold respectively.

A passage 9 is provided around a valve seat 10 at the inlet opening 7 to an outlet 11 from the body which is normally open and which is, in use, connected through the vacuum line 2 to the servo-mechanism 4.

The solenoid coil 5 is located around the valve body 6 as shown.

The closure member for the inlet and outlet openings 7 and 8 is a hollow piston of magnetic material having heads 12 and 13 at each end and radial ports 14 and 15 into the hollow interior 16 of the piston. The opening 8 is closed by head 13 on the piston and opening 7 is closed by a suitable sealing disc 17 interposed between the valve seat 10 and open end of piston head 12. The sealing disc will preferably be of a material having a limited compressibility under operating conditions to prevent any excessive hammering of the piston against the valve seat 10 when full engine vacuum is to be applied to the throttle servo-mechanism.

Peripheral rings 18 are provided adjacent the openings 14 and 15 to guide the piston in the bore 16 through the body 6 and the piston heads are of a size to ensure that there is a fluid passage around the heads and through the piston.

A serious problem which is usually inherent in solenoid operated valves is that they are non-linear in their operation due to the force between the magnetised components being inversely proportional to the square of the distance between them. For the valve to operate effectively without electronic feed back circuits referred to above it is necessary that it have at least a small distance of travel towards closure of opening 7 of a linear or near linear nature. This enables the valve to operate substantially as a linear voltage to pressure converter, the voltage applied to the coil 5 being related to a particular pressure acting on the piston.

The non-linear action of the valve is accentuated by the operating conditions of the vehicle engines where the inlet manifold pressure may vary from say minus ten to minus seventy KPA. These wide variations should not effect the resultant pressure applied to the valve if smooth operation of the servo-mechanism on the throttle is to be achieved.

To obtain the desired results both the magnetic circuit and proportions of valve inlet and outlets are carefully designed in accordance with the results from much experimentation.

It has been found that the outlet opening 8 must be made to provide a severe constriction between this and the inlet 7 and normally open outlet 11. This can also be achieved by predetermining the size of the openings 14 and 15 or of the bore 16 through the piston. The inlet is the largest opening and it has been found that the cross-sectional area of the normally open outlet 11 opening should be between five and ten times as large as the opening of outlet 8.

Also of great importance is the external magnetic circuit of the valve. This is formed by a yoke 19 of magnetic material. This yoke 19 also conveniently forms a mounting bracket for the valve.

The yoke 19 is such that it extends around the coil 5 longitudinally thereof. It is positioned such that the piston will move through the end of the yoke 19 adjacent the outlet 8 but will not move into the end of the yoke 19 at the inlet 7 but will have its movement under voltage applied to the coil effected thereby to bring about a substantially linear movement of the piston adjacent the valve seat 10.

Operation of the valve is illustrated in FIGS. 2 to 4.

In FIG. 2 the valve is shown with the vacuum opening 8 closed by the head 13 of the piston. This is the condition that exists when the automatic control is inoperative.

In FIG. 3 the coil 5 is energised to an extent where the influence of the coil has lifted the piston to open the vacuum inlet 8 while the opening 7 is somewhat restricted and some degree of vacuum has been applied to the servo-mechanism as indicated by the flow lines. This vacuum is dependent upon engine requirements as determined by the speed monitoring circuit with reduction in speed resulting in increased power being applied to the coil 5.

The maximum power condition resulting in a full open, or predetermined maximum opening, of the throttle is shown in FIG. 4 where the atmospheric connection opening 7 is closed and the full manifold vacuum is applied to the servo-mechanism to open the throttle.

This arrangement has the practical result that the pressure applied to the servo-mechanism is proportional to the voltage applied to the solenoid coil from the electronic monitor and control circuit and is independant of manifold pressure fluctuations during operation of the vehicle. This is of course effective over the practical range of pressures in any particular application.

The system will include a switching arrangement which will disconnect the system when the vehicle brakes are applied. Also it will be appreciated that the system is inherently safe since it is operated through a negative pressure of limited value and which can readily be overpowered by the vehicle braking system.

The electronic circuitry can, in a manner known to those skilled in the art, be arranged for the system to operate around one or more predetermined speeds or may be designed so that it can be switched on to operate at any speed at which the vehicle happens to be running at time of switching.

What I claim as new and desire to secure by Letters Patent is:

1. A solenoid operated valve for a vehicle engine control system comprising:

a hollow body of non-magnetic material having an inlet and a first outlet axially aligned with each other;

valve seats provided at said inlet and first outlet;

a hollow piston of magnetic material having a head at each end and slidable in said body between positions where said heads respectively communicate with said valve seats to close the inlet or first outlet from communicating with the interior of said body;

ports provided in said piston wall which are in communication with a normally open second outlet provided in said hollow body, said second outlet being fluidly coupled with said inlet and first outlet, the fluid flow passing between said inlet and second outlet and between said first and second outlets being adjustably varied in dependence on the position of said hollow piston, the fluid flow path between said second outlet and said inlet being configured to provide a considerable constriction to fluid flow; and, a solenoid coil for controlling the position of said piston, said inlet port being open to ambient air, said first outlet being connectable with a vacuum line of said engine, and said second outlet being connectable with a vacuum operated servo mechanism provided on said engine.

2. A solenoid operated valve as claimed in claim 1 wherein said normally open second outlet has a cross-sectional opening area between five and ten times as large as that of said first outlet and is smaller in cross-sectional opening area than said inlet.

3. A solenoid controlled valve as claimed in claim 1 wherein said solenoid coil is located around said hollow body and a yoke of magnetic material longitudinally surrounds said coil such that the piston movement within the coil will be constrained to pass through the end of the yoke adjacent the first outlet but not through the other end of the yoke.

4. A vehicle engine speed control system comprising:
a vacuum operated servo-mechanism for controlling the position of an engine throttle;
a vacuum line connected to said engine;
a vehicle speed monitoring and electrical signal generating circuit providing an electrical signal representative of vehicle speed; and,
a solenoid operated valve for controlling the operation of said servo-mechanism, said solenoid operated valve comprising:
a hollow body of non-magnetic material having an inlet and a first outlet axially aligned with each other, said inlet communicating with ambient air and said first outlet communicating with said vacuum line;
valve seats provided at said inlet and said first outlet;
a hollow piston of magnetic material having a head at each end and slidable in said body between positions where said heads respectively communicate with said valve seats to close the inlet or first outlet from communicating with the interior of said body;
ports provided in said piston wall which are in communication with a normally open second outlet provided in said hollow body, said second outlet communicating with said servo-mechanism and being fluidly coupled with said inlet and first outlet, the fluid flow passing between said inlet and second outlet and between said first and second outlets being adjustably varied in dependence on the position of said hollow piston, the fluid flow path between said second oulet and said inlet being configured to provide a considerable constriction to fluid flow; and,
a solenoid coil responsive to said electrical signal for controlling the position of said piston.

* * * * *